United States Patent
Chandler et al.

(10) Patent No.: US 6,258,187 B1
(45) Date of Patent: Jul. 10, 2001

(54) COPPER TROLLEY WIRE AND A METHOD OF MANUFACTURING COPPER TROLLEY WIRE

(75) Inventors: Thomas J. Chandler, Fairfield, CT (US); John Corrado, Bayonne, NJ (US)

(73) Assignee: Phelps Dodge Industries, Inc., Phoenix, AZ (US)

(*) Notice: Subject to any disclaimer, the term of this patent is extended or adjusted under 35 U.S.C. 154(b) by 0 days.

(21) Appl. No.: 09/134,907

(22) Filed: Aug. 17, 1998

Related U.S. Application Data

(62) Division of application No. 08/884,985, filed on Jun. 30, 1997, now Pat. No. 6,077,364.

(51) Int. Cl.[7] ................................................. C22F 1/08
(52) U.S. Cl. ........................ 148/681; 148/684; 29/527.7
(58) Field of Search .................................. 148/681, 684; 29/527.7

(56) References Cited

U.S. PATENT DOCUMENTS

| | | |
|---|---|---|
| 2,079,239 | 5/1937 | Barthel ................................ 148/11.5 |
| 2,504,935 | 4/1950 | Morris ..................................... 75/153 |
| 3,829,630 | 8/1974 | Belyaev ................................. 191/41 |
| 4,047,980 | 9/1977 | Watson et al. .................... 148/12.7 C |
| 4,067,750 | 1/1978 | Mravic et al. ........................... 148/2 |
| 5,087,300 | 2/1992 | Takayama et al. ............. 148/11.5 Q |
| 5,391,243 | 2/1995 | Goto et al. ............................ 148/554 |
| 5,534,087 | 7/1996 | Hirota et al. .......................... 148/554 |

FOREIGN PATENT DOCUMENTS

| | | |
|---|---|---|
| 43 21 921 | 1/1995 | (DE) . |
| 195 39 174 | 2/1997 | (DE) . |
| 48-032888 | * 10/1973 | (JP) . |
| 54-79121 | 6/1979 | (JP) . |
| 55-154540 | * 12/1980 | (JP) . |
| 56-044759 | * 4/1981 | (JP) . |
| 61-023736 | * 2/1986 | (JP) . |
| 61-023737 | * 2/1986 | (JP) . |
| 3-56633 | 3/1991 | (JP) . |
| 07090430 | * 4/1995 | (JP) . |
| 07166274 | * 6/1995 | (JP) . |

OTHER PUBLICATIONS

Avitzur, B., *Handbook of Metal–Forming Processes*, John Wiley & Sons, New York, 1983, pp. 35–248.

Boyer, H.E. et al., ed., *Metals Handbook, Desk Edition*, American Society for Metals, Metals Park, Ohio, 1985, pp. 7–24 through 7–26.

"Standard Specification for Copper Trolley Wire—Designation: B47–95a," ASTM Committee on Standards, American Society for Testing and Materials, West Consohocken, PA, 1995.

"How Tough Do You Need It?," Copper Rod Bulletin, Southwire Company, Carrollton, GA, 1996.

Fisher, H. J.; Hay, D. A.; Finlay, W. L., Development and Properties of a New High–Conductivity/High–Strength Copper Alloy, Inst. Metals, Monogr. Rep. Ser. (1970), No. 34, 256–63.*

* cited by examiner

*Primary Examiner*—Sikyin Ip
(74) *Attorney, Agent, or Firm*—Fish & Neave; Jeffrey H. Ingerman; Eric H. Huang

(57) ABSTRACT

Copper trolley wire consisting essentially of at least 99.90% copper and at most 0.10% of a metal selected from the group consisting of silver, cadmium, tellurium, titanium, magnesium, manganese, chromium, zirconium, tin and combinations thereof, has a minimum tensile strength well exceeding that listed in ASTM Standard B47-95a for copper trolley wire. The copper trolley wire has a uniform fine grain size. The copper trolley wire is manufactured using a process of casting a copper rod of the appropriate composition, hot working or "conforming" the cast rod to reduce its diameter, and then cold working it to form the desired wire by drawing it through one or more dies. Preferably, no annealing step is used.

7 Claims, 6 Drawing Sheets

PHOTOMICROGRAPH (100 X MAGNIFICATION)

Sections A-A

COPPER TROLLEY WIRE AND A METHOD OF MANUFACTURING COPPER TROLLEY WIRE

CROSS REFERENCE TO RELATED APPLICATION

This is a division of, commonly-assigned U.S. patent application Ser. No. 08/884,985, filed Jun. 30, 1997 now U.S. Pat. No. 6,077,364.

FIELD OF THE INVENTION

This invention relates to the field of copper trolley wire, also known as the contact wire in overhead catenary rail systems. The invention relates to a copper trolley wire having improved mechanical properties and to a method of manufacturing the copper trolley wire with improved mechanical properties.

BACKGROUND OF THE INVENTION

Copper trolley wire has been in commercial use for a long time. There is a standard set forth by the American Society for Testing and Materials (ASTM), as ASTM B47-95a, which is titled the Standard Specification for Copper Trolley Wire and which is reproduced in the Appendix to this specification. It is well known and straight forward for those of skill in this art to make copper trolley wire in accord with this ASTM standard.

This ASTM standard lists the minimum acceptable mechanical properties for copper trolley wire at various wire sizes. For example, grooved wire of a copper and silver alloy having a nominal area of 300,000 circular mils(cmils) is required by the ASTM standard to have a minimum tensile strength of 48,000 pounds per square inch (psi).

Table 1 below contains the tensile requirements for silver bearing round wire found in Table 1 of ASTM 47-95a, which is reproduced in the Appendix as Table 3. Table 2 below contains the tensile requirements for silver bearing grooved wire found in Table 2 of ASTM 47-95a, which is reproduced in the Appendix as Table 4.

TABLE 1

| ASTM B47-95a Tensile Requirements For Silver-Bearing Round Wire | | |
| --- | --- | --- |
| Diameter, in. | Area, cmils | Tensile Strength, min. psi |
| 0.5477 | 300000 | 48500 |
| 0.4600 | 211600 | 51500 |
| 0.4096 | 167800 | 53000 |
| 0.3648 | 133100 | 54000 |
| 0.3249 | 105600 | 55000 |

TABLE 2

| ASTM B47-95a Tensile Requirements For Silver-Bearing Grooved Wire | |
| --- | --- |
| Nominal Area, cmils | Tensile Strength, min. psi |
| 350000 | 44600 |
| 300000 | 48000 |
| 211600 | 51300 |

TABLE 2-continued

| ASTM B47-95a Tensile Requirements For Silver-Bearing Grooved Wire | |
| --- | --- |
| Nominal Area, cmils | Tensile Strength, min. psi |
| 167800 | 52700 |
| 133100 | 53000 |

Typical methods for manufacturing copper trolley wire that meets the ASTM standard include methods such as continuous casting, rolling, and/or drawing (e.g., area reduction) and combinations thereof. Such methods are disclosed, for example, in Avitzur, *Handbook of Metal Forming Processes* (John Wiley & Sons 1983). These known methods are sometimes referred to as cold working and in some instances utilize an annealing step. Another known method for producing copper trolley wire meeting the minimum ASTM standards is to begin with a large wire bar, and drawing and/or rolling the wire bar to the desired dimension.

However, copper trolley wire manufactured in the typical way is limiting to the design of rail systems using such wire. For example, in a rail system using copper trolley wire, substations for electrical power must be placed at certain distances apart from each other. If it is desired to reduce the number of substations, copper trolley wire made to comply with the ASTM standard is inadequate because it lacks the desired tensile strength. Also for example, the advent of high speed rail and the desire to reduce costs have exposed practical limitations in copper trolley wire that has the mechanical properties listed in the ASTM standard.

Therefore, it has become desirable to have a copper trolley wire that has improved mechanical properties. It is also desirable to obtain such improved mechanical properties in copper trolley wire using a commercially acceptable manufacturing process, namely a process that is not cost prohibitive. Specifically, the need is to develop a trolley wire that can provide rail design options not currently available and that can withstand the rigors of high speed rail transit, while still providing sufficient transfer of electricity.

Therefore, it is an object of this invention to provide a copper trolley wire with improved mechanical properties. More specifically, it is an object of this invention to provide a copper trolley wire with tensile strength well exceeding the minimum listed in the ASTM standard.

It is also an object of this invention to provide a method of making copper trolley wire with improved mechanical properties. Further, it is an object of this invention to provide a method of making copper trolley wire in a commercially feasible manner.

SUMMARY OF THE INVENTION

These objects are met by the invention described herein by providing a high conductivity copper or copper alloy trolley wire used as an electrical contact with improved tensile strength. The increased tensile strength significantly exceeds industry standards and the ASTM standard allowing improved design and lower cost with regard to tensile loading on the wire. Typically, the copper trolley wire of this invention has a tensile strength of at least 10% greater than that listed in ASTM B47-95a. The copper content of this new trolley wire is about 99.90% (with this percentage optionally including small amounts of silver) and can be alloyed with various known alloying ingredients, such as silver, cadmium, magnesium, manganese, tellurium, chromium, zirconium titanium or tin. Preferably, the new copper trolley wire has a relatively fine grain size, generally not exceeding about 0.040 mm, which can be achieved through the manufacturing method disclosed herein. The copper trolley wire of this invention also has improved properties, as compared to the copper trolley wire in ASTM B47-95a, in the areas of ductility, yield point, hardness, and creep, while maintaining high conductivity. The new copper trolley wire of this invention has the same or better conductivity (also known as resistivity) as in ASTM B47-95a.

ASTM standard B47-95a requires a maximum resistivity at 20° C. of 900.77 $\Omega$-lb/mile$^2$, which corresponds to a minimum conductivity of 97.16% IACS.

Also, this invention includes a cost effective method of manufacturing the improved copper trolley wire. Generally, the new method of making copper trolley wire utilizes a hot working step in addition to the known methods of cold working. Known methods also use an annealing step to recrystallize the copper trolley wire. However, the new method of this invention works the copper trolley wire while generating heat, and thus a heating (or annealing) step is not necessary to the method. Without being bound by any theory, it is believed that the new method which uses hot working, also referred to herein as conforming or extrolling, advantageously reduces the grain size of the copper trolley wire prior to the cold working steps. This is not to say that annealing cannot be used in conjunction with this invention. However, the method of this invention preferably excludes annealing as a separate step in the process of making the new copper trolley wire disclosed herein.

More specifically, this invention provides a method for making copper trolley wire comprising the steps of continuously casting a copper rod of about 99.90% copper, conforming the copper rod to arrive at a coil of wire, cold working the coil of wire to the desired dimension, optionally annealing the cold worked wire at known industry temperatures and cold working the wire again to a final desired dimension.

BRIEF DESCRIPTION OF THE DRAWINGS

FIG. 5 is explained in the Appendix.

FIG. 6 is explained in the Appendix.

DETAILED DESCRIPTION OF THE PREFERRED EMBODIMENTS

The new copper trolley wire of this invention is a wire that generally complies with the dimensions set forth in ASTM B47-95a. More preferably, the trolley wire is grooved copper trolley wire. The dimensions of the new wire can vary in accord with the ASTM standard.

The copper trolley wire is comprised mostly of copper. The copper content is about 99.90% by weight. The copper may be alloyed with known alloying agents, including silver, cadmium, tellurium, titanium, magnesium, manganese, chromium, zirconium or tin. The total amount of alloying agents should not exceed 0.10% by weight. The alloying agents should be employed in a manner that does not adversely affect the conductivity of the wire.

The copper trolley wire of the invention has a tensile strength much improved over that of the ASTM standard. This new copper trolley wire has a tensile strength of at least 10% greater than that required for silver bearing copper trolley wire listed in ASTM B47-95a, Tables 1 and 2. Preferably, the tensile strength is at least 12% greater than that required for silver bearing copper trolley wire listed in ASTM B47-95a. More preferably, the tensile strength is at least 15% greater, and most preferably at least 16% greater than the tensile strength for silver bearing copper trolley wire listed in ASTM B47-95a, Tables 1 and 2. For example, a copper trolley wire of this invention having an area of 300,000 cmils has a tensile strength of at least 54,000 psi, which is about 12.5% above the standard specification. In practice, a 300,000 cmil wire of this invention has a tensile strength of about 56,000 psi, which about 16.6% greater than the standard specification. The tensile strength is measured by methods known to those skilled in the art, specifically, ASTM E8-96.

Other properties of the copper trolley wire of this invention that are improved over the wire in ASTM B47-95a include ductility (or elongation), yield strength, hardness and creep. Ductility is measured in accordance with ASTM E8-96. Yield strength is measured in accordance with ASTM E8-96. Hardness is measured in accordance with ASTM E18-94. Creep is measured in accordance with ASTM E139-95. The electrical conductivity is measured in accord with ASTM B193-95. In particular, the electrical conductivity of the copper trolley wire of this invention is at least that of the wire specified in ASTM B47-95a, which may be referred to as resistivity.

Figure 1:
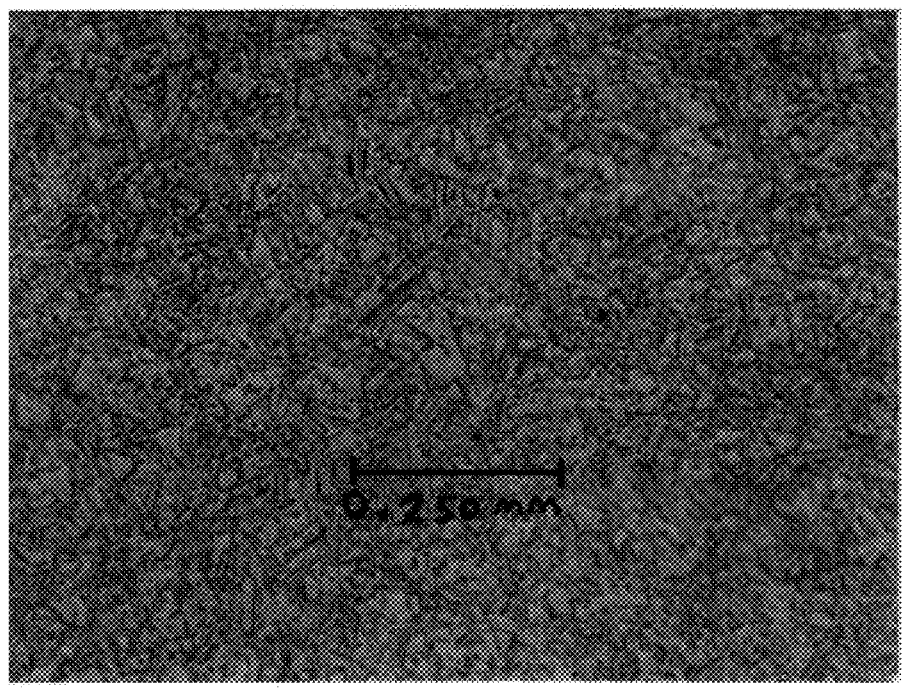
FIG. 1 is a photomicrograph of the transverse cross-section of the new copper trolley wire, showing the fine grain size, at 100×.

The grain size of the copper trolley wire of this invention is measured in accord with ASTM E112-95. The grain size is measured after the conforming step and is relatively fine and uniform throughout the microstructure. The grain size should not exceed an average diameter of 0.040 millimeters (mm). Preferably, the grain size should not exceed an average diameter of 0.035 mm, and most preferably, 0.025 mm. FIG. 1 is a photomicrograph of the new copper trolley taken at 10× magnification wire showing an average grain size diameter of about 0.025 mm.

Figure 2:
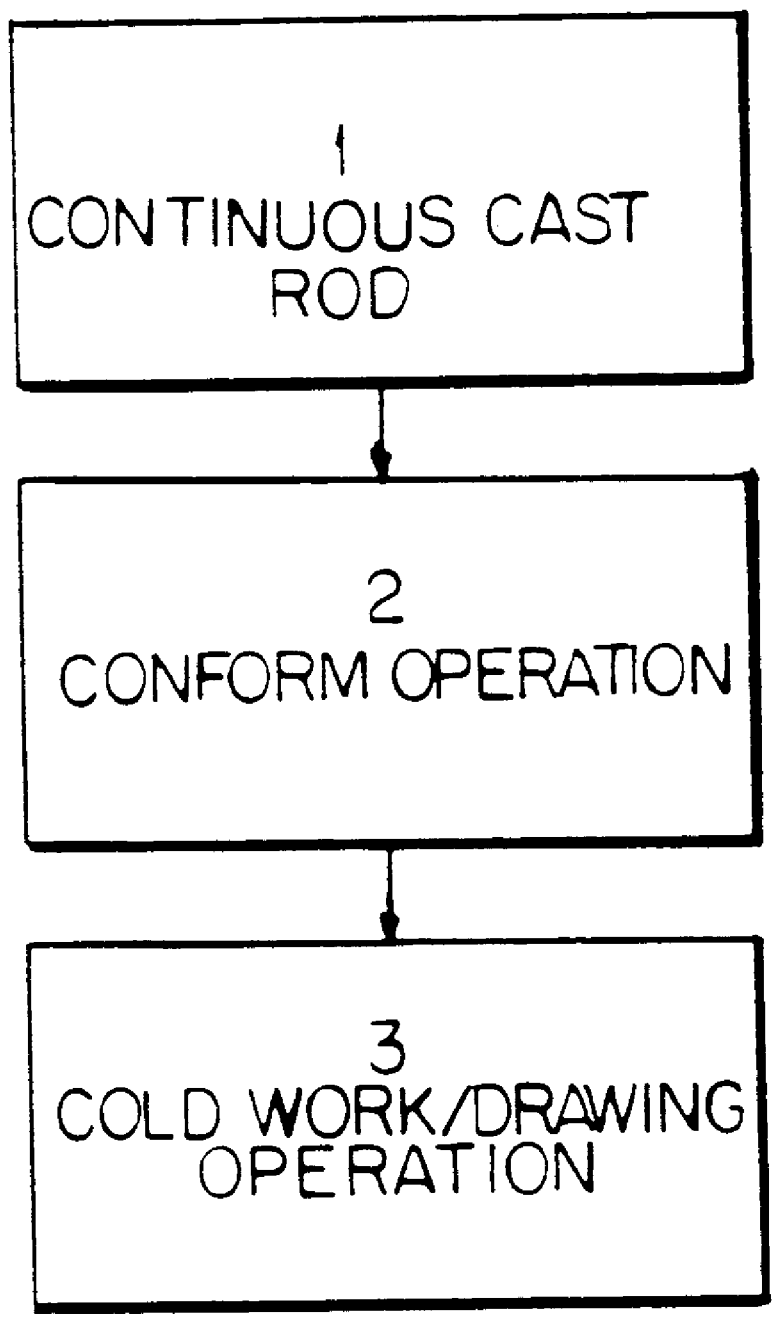
FIG. 2 is a process flow diagram of the new process to manufacture the copper trolley wire of this invention having improved mechanical properties.

The copper trolley wire of this invention is manufactured generally by continuous casting a copper rod, conforming the copper rod into a wire, and cold working the wire to obtain a final product. This general process is depicted in FIG. 2. More preferably, the process is comprised of casting a copper alloy including 99.90% by weight copper with additions of silver at a minimum of 8 oz per short ton to a maximum of 50 oz per short ton; then continuously or semi-continuously casting the copper alloy into a wire form; the copper alloy cast wire is then conformed, e.g., copper alloy cast wire is hot worked via continuous or semi-continuous extrusion to obtain the desired grain size; and the hot worked alloy is subsequently cold worked to a desired final dimension.

The method of manufacturing is shown generally in FIG. 2. As shown in FIG. 2, the first step 1 is preferably to continually cast copper into a round rod. The second step 2 is to conform the round copper rod, which reduces the size of the rod. The last step 3 is to cold work the copper rod by drawing it through dies at about room temperature to achieve the final desired rod size. A minimum of 65% cold work is performed following the conforming or extrolling step to achieve the improved tensile strength.

This method of manufacturing results in a reduced cross sectional area when comparing the area of the final wire to the area of the wire after the conforming step. The wire of this invention has a cross sectional area of reduced by about 65% from the wire area after conforming. Preferably, the cross sectional area is reduced by at least 65%, and more preferably by at least 75%.

The steps of continuous casting, cold working and annealing are well known in the industry to those of skill in this art. Avitzur, *Handbook of Metal Processes* (John Wiley & Sons 1983) describes cold working and annealing in chapters 3–5, and is incorporated herein by reference for its teachings. Continuous casting is also well known in the industry to those of skill in the art, a discussion of which is included in Avitzur.

Figure 3:
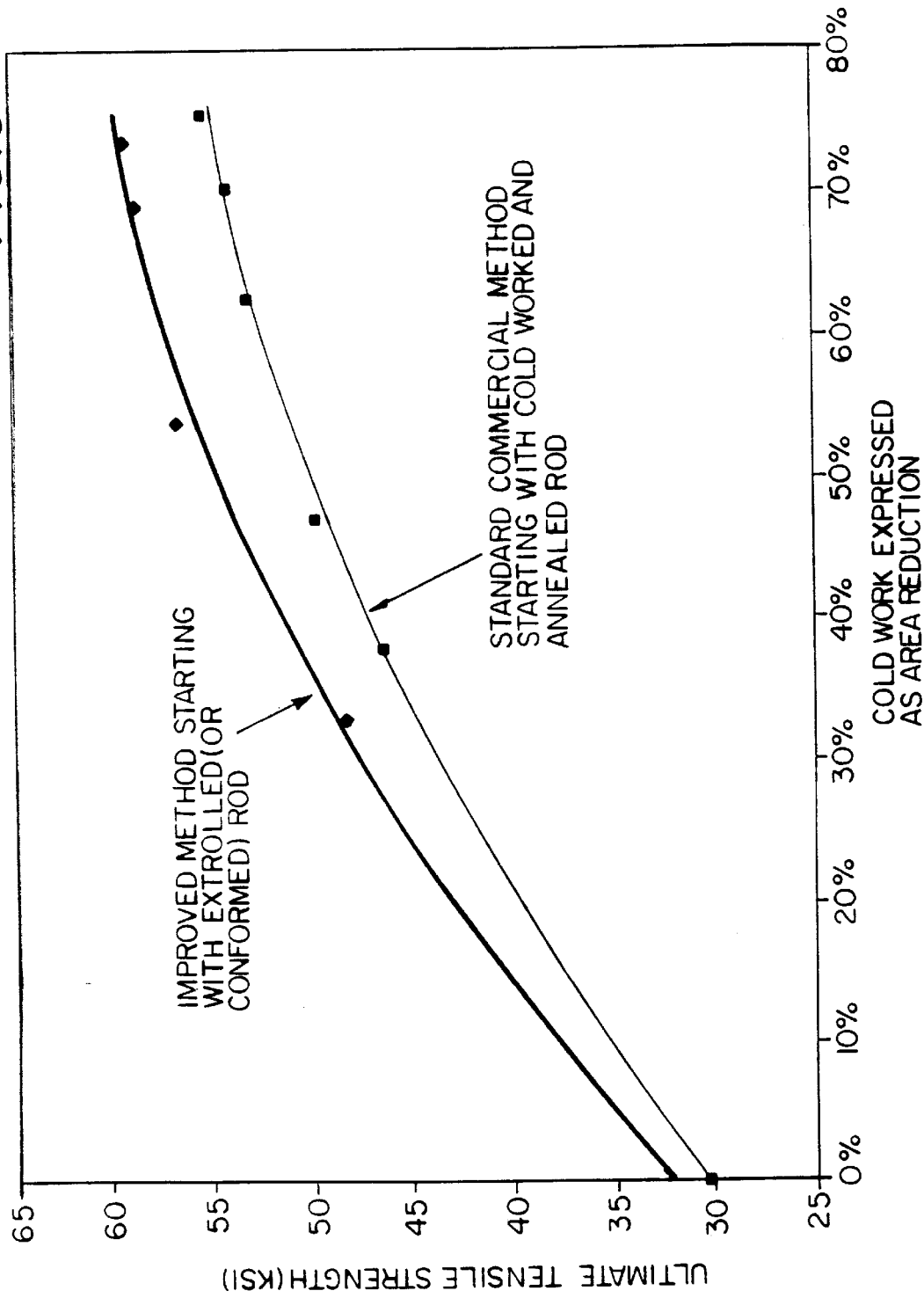
FIG. 3 is a graph comparing the tensile strength of the copper trolley wire of this invention as compared to copper trolley wire made by standard commercial methods.

Conforming, also known as extrolling, is generally known, but not in the field of copper trolley wire. For a description, see Avitzur, pp. 221–227, which is incorporated herein by reference. More preferably, conforming is employed in the inventive process without an annealing step. The benefits of applying conforming to copper trolley wire is shown in FIG. 3. FIG. 3 is a comparison of copper trolley wire prepared by known industry methods to the inventive copper trolley wire made with the conforming step and without an annealing step. FIG. 3 shows that higher tensile strengths can be achieved with this inventive method, as compared to the industry standard.

The following is a description of test results for the properties of copper trolley wires made according specific examples of the present invention, along with the properties of copper trolley wires from ASTM B47-95a. The copper trolley wire of the present invention were manufactured in the following manner, as depicted in FIG. 2. For these examples, copper was continuously cast into a round rod with a diameter ranging from 22 mm to 32 mm. The rod had a purity of 99.90% minimum copper. During casting, the rod was alloyed with silver up to 0.10%. The continuous cast rod was then put through an extrolling process which reduced the size of the rod to a diameter ranging from 19 mm to 28 mm. Typical characteristics and properties of the extrolled rod include:

A tolerance of +/−1% of the specified diameter;

A hardness of 50 maximum of the Rockwell F scale;

A grain size of 0.040 mm maximum;

A tensile strength of 31,000 psi to 35,000 psi;

A minimum elongation of 40%;

A minimum electrical conductivity of 100% IACS @ 20° C.; and

A clean, bright, smooth surface.

The extrolled rod was then cold drawn through a series of round dies, except that the final die had the shape (round or grooved) of the required trolley wire product. The wire was drawn through dies either individually or though a series of successive dies. The area of the wire is reduced 15% to 30% through each die, reducing the size of the wire and thereby increasing the tensile strength. A minimum of 65% cold work is performed following the extrolling operation to achieve the improved tensile strength.

Figure 4:
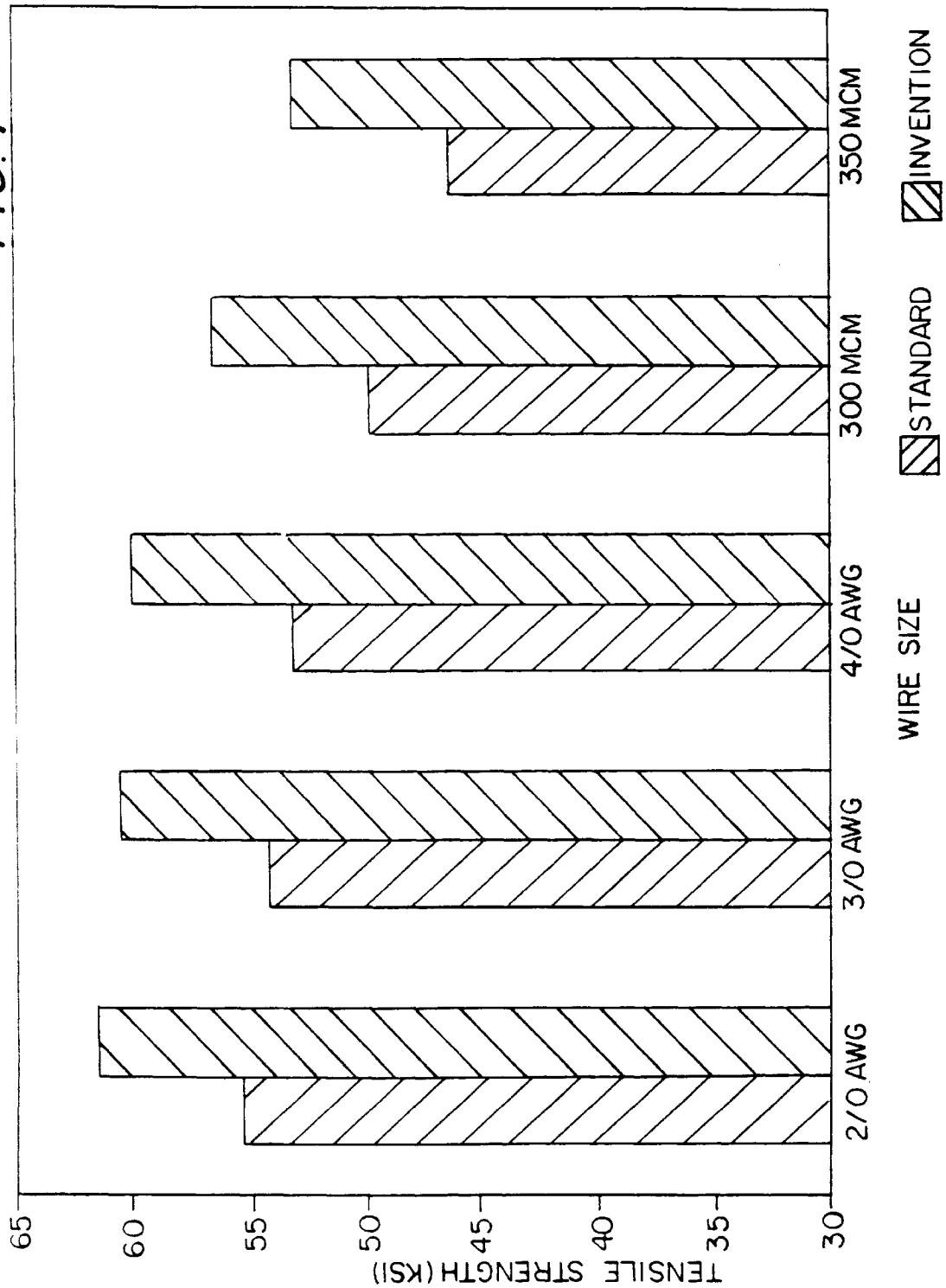
FIG. 4 is a bar graph showing the increased tensile strength of various sizes of the new copper trolley wire as compared to copper trolley wire made by standard commercial methods.

These copper trolley wires were then tested for their tensile strength and compared to the tensile strength of copper trolley wires made by standard commercial methods. The results of this comparison are shown in FIG. 4. The bottom of FIG. 4 shows the wire sizes in cmils and American Wire Gauge (AWG). FIG. 4 demonstrates that for each wire size the tensile strength increased at least 10% using the new process.

A comparison of the tensile strength of the copper trolley wire of this invention to the minimum tensile strength requirements of ASTM B47-95A also reveals the much improved tensile strength of the new copper trolley wire.

| Wire Size Area (cmils) | Minimum Tensile Strength from ASTM B47-95a for Silver Bearing copper (psi) | Minimum Tensile Strength of Inventive Wire (psi) |
|---|---|---|
| 350,000 | 44,600 | 51,000 |
| 300,000 | 48,000 | 54,000 |
| 211,600 (4/0 AWG) | 51,300 | 57,000 |
| 167,800 (3/0 AWG) | 52,700 | 58,000 |
| 133,100 (2/0 AWG) | 53,000 | 59,600 |

In addition to improved tensile strength of the copper trolley wire of this invention, other properties of the copper trolley wire are improved in comparison to standard industry copper trolley wire. For example, a copper trolley wire of this invention having a size of 300,000 cmils was found to have the following properties:

| Property | Results |
|---|---|
| Tensile Strength | 56,000 psi |
| Yield Strength | 53,000 psi |
| Elongation | 7.0% |
| Hardness | 60 Rockwell B |
| Electrical Conductivity | 99.0% IACS @20° C. |
| Grain Size | 0.025 mm |

Thus, as those of skill in this art will recognize, the improvement in properties for the copper trolley wire of this invention is dramatic.

APPENDIX

ASTM B47-95a

Standard Specification for Copper Trolley Wire

This specification is under the jurisdiction of ASTM Committee B-1 on Electrical Conductors and is the direct responsibility of B01.04 on Conductors of Copper and Copper Alloys.

1. Scope 1.1 This specification covers round and grooved hard-drawn copper and silver-bearing copper trolley wire.

1.2 The values stated in inch-pound units are to be regarded as the standard. The values given in parentheses are for information only.

2. Referenced Documents 2.1 ASTM Standards:

B 49 Specification for Copper Redraw Rod for Electrical Purposes (Annual Book of ASTM Standards, Vol 02.01)

B 193 Test Method for Resistivity of Electrical Conductor Materials (Annual Book of ASTM Standards, Vol 02.03)

3. Ordering Information
   3.1 Orders for material under this specification shall include the following information:
      3.1.1 Quantity of each size and section,
      3.1.2 Wire size: diameter in inches (see 6.1 and Table 3) or area in circular mils (see 10.1 and FIG. 5),
      3.1.3 Shape of section (Section 1),
      3.1.4 Type of copper, if the addition of silver of 25 troy oz./short ton minimum, is required (see Section 4 and Explanatory Note 1),
      3.1.5 Package size (see 18.3),
      3.1.6 Lagging, if required (see 18.1),
      3.1.7 Relation between vertical axis of grooved wire and axis of reel (see 18.1),
      3.1.8 Size of arbor hole, if special (see 18.2),
      3.1.9 Special package marking, if required (see 18.4), and
      3.1.10 Place of inspection (Section 16).
4. Materials and Manufacture
   4.1 The material shall be copper of such quality and purity that the finished product shall have the properties and characteristics prescribed in this specification.
   Note—Specification B 49 defines the materials suitable for use.
   4.2 Copper redraw rod of special qualities, forms, or types, as may be agreed upon between the manufacturer and the purchaser, and that will conform to the requirements prescribed in this specification may also be used.
   4.3 Either oxygen-free or tough pitch copper may be supplied. Tests for oxygen content of the copper are not a requirement of this specification.

Round Wire

5. Tensile Properties
   5.1 Round wire shall conform to the requirements as to tensile properties specified in Table 3.
   5.2 Tests on a specimen of round wire containing a joint shall show at least 95% of the tensile strength specified in Table 3. Elongation tests shall not be made on specimens containing joints.
   5.3 Tension tests shall be made on representative samples. The elongation shall be determined as the permanent increase in length, due to the breaking of the wire in tension, measured between gage marks placed originally 10 in. apart upon the test specimen (Explanatory Note 2). The fracture shall be between the gage marks and not closer than 1 in. to either gage mark.
6. Dimensions and Permissible Variations
   6.1 The size of round trolley wire shall be expressed as the diameter of the wire in decimal fractions of an inch, to the nearest 0.1 mil (0.0001 in.).
   6.2 Wire shall be truly cylindrical in form. The diameter shall not vary more than plus and minus 1% from that specified.
7. Twist Test
   7.1 For the purpose of determining and developing defects which may be prejudicial to the life of trolley wire, owing to its peculiar service as compared to that of wire for other purposes, round wire shall be subjected to the twist test described in 7.2. Round wire that does not withstand at least 9 twists without breaking shall not be considered satisfactory.
   7.2 Three twist tests shall be made on specimens 10 in. (254 mm) in length between the holders of the testing machine. The twisting machine shall be so constructed that there is a linear motion of the tail stock with respect to the head. The twist shall be applied not faster than 10 turns/min.
All three specimens shall be twisted to destruction and shall not reveal under test any seams, pits, slivers, or surface imperfections of sufficient magnitude to indicate inherent defects or imperfections in the wire. At the time of fracture, the wire shall twist with reasonable uniformity.

Grooved Wire

8. Tensile Properties
   8.1 Grooved wire shall conform to the requirements as to tensile properties specified in Table 4.
   8.2 Tests on a specimen of grooved wire containing a joint shall show at least 95% of the tensile strength specified in Table 4. Elongation tests shall not be made on specimens containing joints.
   8.3 The tension and elongation tests for grooved wire shall be made in the same manner as those on round wire as described in 5.3.

TABLE 3

Tensile Requirements (See Explanatory Note 3)

| | | Tensile strength, min. psi | | |
|---|---|---|---|---|
| Diameter, in. | Area, cmils | No silver added | 25 troy oz. min./short ton added | Elongation in 10 in., min, % |
| 0.5477 | 300000 | 46400 | 48500 | 4.50 |
| 0.4600 | 211600 | 49000 | 51500 | 3.75 |
| 0.4096 | 167800 | 51000 | 53000 | 3.25 |
| 0.3648 | 133100 | 52800 | 54000 | 2.80 |
| 0.3249 | 105600 | 54500 | 55000 | 2.40 |

TABLE 4

Tensile Requirements (See Explanatory Note 3)

| | Tensile strength, min. psi | | |
|---|---|---|---|
| Nominal Area, cmils | No silver added | 25 troy oz. min./short ton added | Elongation in 10 in., min, % |
| 350000 | 42800 | 44600 | 4.50 |
| 300000 | 44200 | 48000 | 4.50 |
| 211600 | 46600 | 51300 | 3.75 |
| 167800 | 48500 | 52700 | 3.25 |
| 133100 | 50200 | 53000 | 2.80 |

9. Sections
   9.1 Standard sections of grooved trolley wire shall be those known as the "American Standard Grooved Trolley Wire Sections" (the Standard Design of the American Transit Engineering Association) shown in FIG. 5 and Table 5.
10. Dimensions and Permissible Variations
   10.1 The size of grooved trolley wire shall be expressed as the nominal area of cross section in circular mils, the standard sizes being as specified in FIG. 5 and Table 5.
   10.2 The weight in pounds per mile of grooved trolley wire calculated from the weight of a specimen not less than 18 in. in length shall not vary more than plus and minus 4% from that specified in FIG. 5 and Table 5.
   10.3 Conformance of the trolley wire to the specified dimensions shall be determined by taking the measurements shown in FIG. 5 and Table 5 under the heading, "Dimensions for Inspection, in." The shape of the groove shall be checked with the appropriate "go" and "no-go" slip gages described in FIG. 6 and Table 6. The gages shall be applied to the ends of the samples taken from each reel. Samples shall be clean and ends free from burrs. The groove shall be considered as conforming to these specifications if the "go" gage can be pushed on the straightened wire by hand and the "no-go" gage cannot be pushed on the wire.

11. Twist Test 11.1 The twist test shall be omitted.

Round and Grooved Wire

12. Resistivity 12.1 Electrical resistivity shall be determined on representative samples by resistance measurements (Explanatory Note 4). At a temperature of 20° C. The resistivity shall not exceed 900.77 $\Omega \cdot lb/mile^2$.

12.2 Electrical resistivity shall be determined in accordance with Test Method B 193.

13. Density 13.1 For the purpose of calculating weights, cross sections, etc., the density of the copper shall be taken as 8.89 g/cm$^3$ (0.32117 lb/in.$^3$) at 20° C. (Explanatory Note 5).

14. Joints 14.1 No joints shall be made in the completed wire. Joints in the wire and rods made prior to final drawings shall be in accordance with the best commercial practice, and shall be capable of meeting the tensile strength requirements in 5.2 or 8.2.

15. Workmanship, Finish, and Appearance 15.1 The wire shall be of uniform size, shape, and quality throughout, and shall be free from all scale, flaws, splits and scratches not consistent with the best commercial practice.

16. Inspection 16.1 All tests governing the acceptance or rejection of the wire, unless otherwise specified, shall be made at the place of manufacture with apparatus furnished by the manufacturer and in the presence of the purchaser or his representative, who shall be furnished a copy of the tests. The manufacturer shall afford the inspector representing the purchaser all reasonable facilities, without charge, to satisfy him as to the reliability of the results before the wire is delivered. If the purchaser waives inspection, and if he so elects at that time, he shall be furnished with a certified copy of tests made by the manufacturer.

17. Rejection 17.1 Any reel of wire that fails to conform to the requirements prescribed in this specification may be rejected. Failure of 30% of the number of reels ready for inspection at one time shall be deemed sufficient cause for the rejection of the whole lot.

18. Packaging and Package Marking 18.1 All wire shall be shipped on substantial reels, suitable for the weight of the wire handled, and shall be well protected from injury. The diameter of the reel drums shall be sufficiently large, not less than 30 in., (762 mm) to eliminate difficulty with waves or kinks when the wire is strung. If reels are to be lagged, it shall be so specified by the purchaser. The wire shall be reeled with turns tightly together, in uniform layers, free from kinks and crosses. The relationship between the vertical axis of grooved wire as finally strung and the axis of the reel shall be as specified by the purchaser and shall be approximately constant. 18.2 The ends of the wire shall be securely fastened to the sides of the reel with no less than six staples. The staples shall be at least 2 in. (50 mm) in length and made from wire not less than 0.145 in. (3.7 mm) in diameter. Care shall be exercised in stapling so that there is no damage to the surface of the exposed layer of wire. All reels shall have the arbor holes reinforced with steel plate at least ½ in. in thickness. Unless otherwise specified, round arbor holes shall be for a 2½-in. (63.5-mm) shaft. Unless otherwise specified, shipments to railroads shall be made on reels having an arbor hole 4-in. (102-mm) square.

TABLE 5

Figure 5:
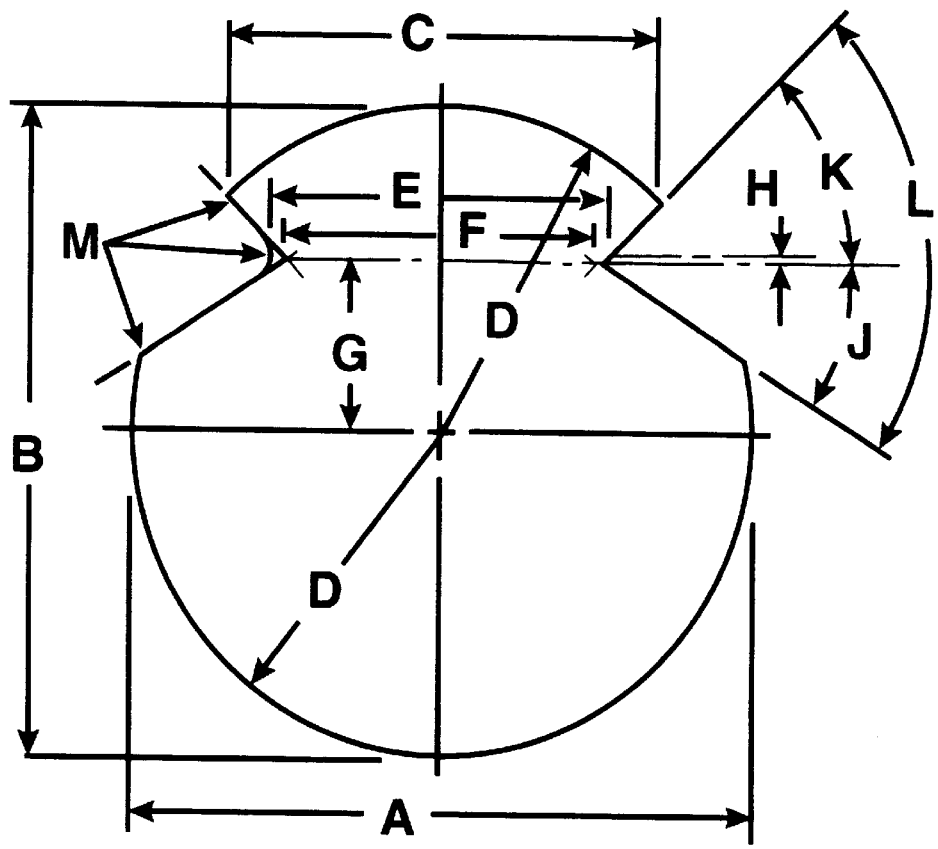
FIG. 5 is a diagram indicating dimensions for standard sections of grooved trolley wire, as depicted in ASTM standard B47-95a and Table 5 of this specification.

Standard Sections Grooved Trolley Wire (See FIG. 5.)

| Nominal size, cmils | 133100 | 167800 | 211600 | 300000 | 350000 |
|---|---|---|---|---|---|
| Area, in.$^2$ (Explanatory Note 6) | 0.1083 | 0.1314 | 0.1665 | 0.2355 | 0.2758 |
| Area, cmils (Explanatory Note 6) | 137900 | 167300 | 212000 | 299800 | 351200 |
| Weight, lb/mile (Explanatory Note 6) | 2205 | 2674 | 3389 | 4792 | 5612 |
| Dimensions for Reference, in. | | | | | |
| A | 0.388 + 0.006 − 0.012 | 0.429 + 0.006 − 0.012 | 0.482 + 0.006 − 0.012 | 0.574 + 0.010 − 0.012 | 0.620 + 0.010 − 0.012 |
| B | 0.392 ± 0.007 | 0.430 ± 0.008 | 0.482 ± 0.009 | 0.574 ± 0.011 | 0.620 ± 0.012 |
| C | 0.318 ± 0.007 | 0.340 ± 0.007 | 0.376 ± 0.007 | 0.376 ± 0.007 | 0.376 ± 0.007 |
| D--radius | 0.196 | 0.215 | 0.241 | 0.287 | 0.310 |
| E | 0.217 + 0.005 − 0.010 | 0.237 + 0.005 − 0.010 | 0.267 ± 0.010 | 0.267 ± 0.010 | 0.267 ± 0.010 |
| F | 0.200 | 0.220 | 0.250 | 0.250 | 0.250 |
| G | 0.031 | 0.047 | 0.063 | 0.127 | 0.156 |
| H | 0.005 | 0.005 | 0.005 | 0.005 | 0.005 |
| J | 27 ± 2° | 27 ± 2° | 27 ± 2° | 27 ± 2° | 27 ± 2° |
| K | 51 ± 2° | 51 ± 2° | 51 ± 2° | 51 ± 2° | 51 ± 2° |
| L | 78° | 78° | 78° | 78° | 78° |
| M--radius | 0.015 + 0.010 − 0.005 | 0.015 + 0.010 − 0.005 | 0.015 + 0.010 − 0.005 | 0.015 + 0.010 − 0.005 | 0.015 + 0.010 − 0.005 |

Note--Dimension H is defined by two center lines, of which the upper is the center line of the radius of the groove and the lower is the center line of the groove.

18.3 The length or weight of wire to be wound upon each reel shall be agreed upon between the manufacturer and the purchaser in placing individual orders.

18.4 Reels shall be marked legibly and indelibly with a serial number, size, kind, length, and weight of wire, and such other information as is specified by the purchaser.

TABLE 6

Figure 6:
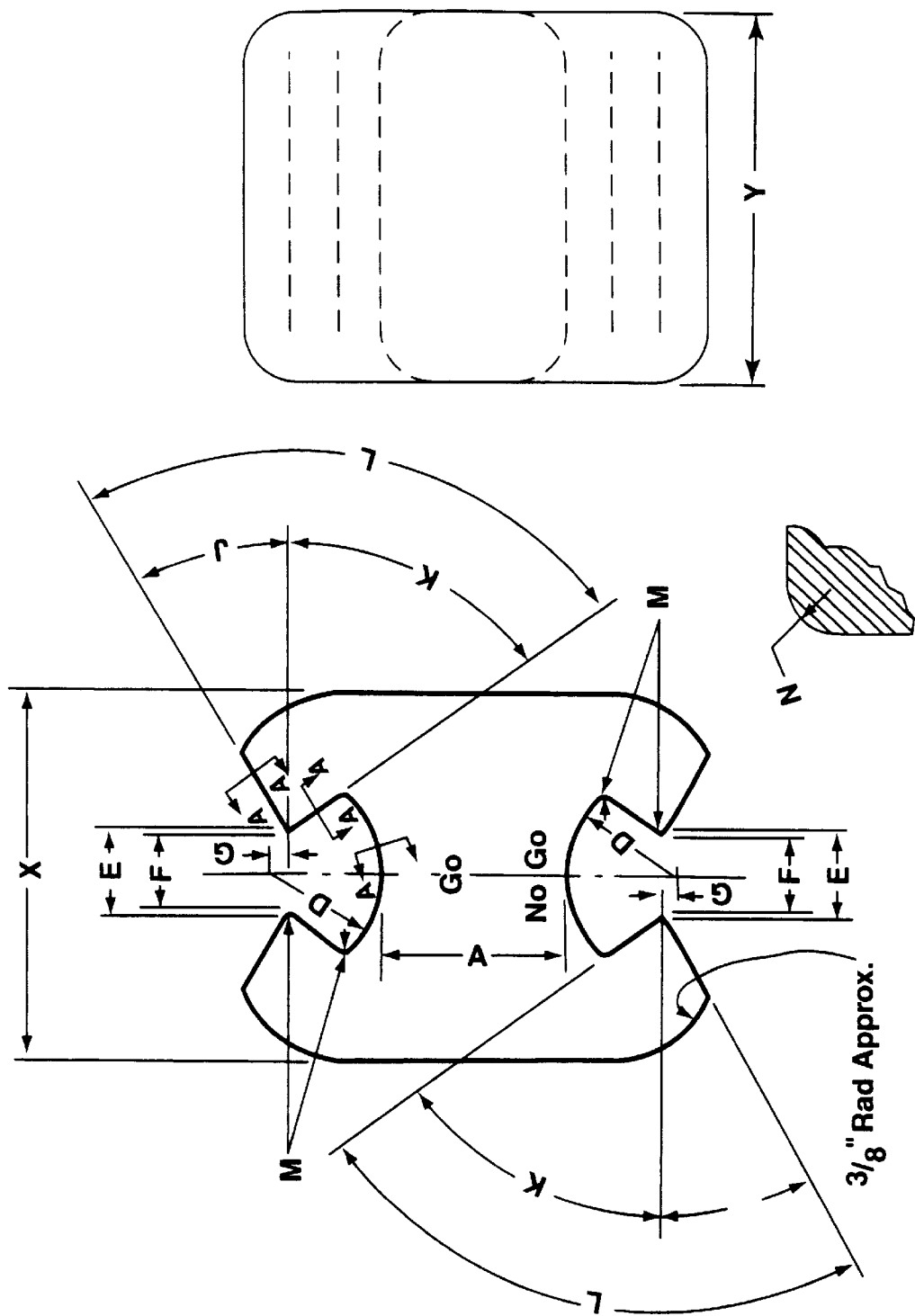
FIG. 6 is a diagram of the slip gage for testing the groove of a trolley wire, as depicted in ASTM standard B47-95a and Table 6 of this specification.

Slip Gage for Testing Groove of Trolley Wire (see FIG 6.)
Dimensions of Gage, in. (Except as indicated)

| | For Trolley Wire of Nominal Size 133100 cmil | | For Trolley Wire of Nominal Size 167800 cmil | | For Trolley Wire of Nominal Sizes 211600, 300000, and 350000 cmil | |
|---|---|---|---|---|---|---|
| Dimension | Go | No-Go | Go | No-Go | Go | No-Go |
| D | 5/16 | 5/16 | 5/16 | 5/16 | 5/16 | 5/16 |
| E | 0.223 ± 0.0005 | 0.207 + 0.000 − 0.001 | 0.243 ± 0.0005 | 0.227 + 0.000 − 0.001 | 0.278 ± 0.0005 | 0.257 + 0.000 − 0.001 |
| F | 0.212 | 0.200 | 0.235 | 0.220 | 0.268 | 0.248 |
| G | 0.031 | 0.031 | 0.047 | 0.047 | 0.063 | 0.063 |
| J | 25° | 29° | 25° | 29° | 25° | 29° |
| K | 53° | 53° | 53° | 53° | 53° | 53° |
| L | 78° | 82° | 78° | 82° | 78° | 82° |
| M--radius | 0.010 ± 0.002 | 0.010 ± 0.002 | 0.010 ± 0.002 | 0.010 ± 0.002 | 0.010 ± 0.002 | 0.010 ± 0.002 |
| N--radius | 1/16 | 1/16 | 1/16 | 1/16 | 1/16 | 1/16 |
| V | ½ | ½ | ½ | ½ | ½ | ½ |
| X | 1 | 1 | 1 | 1 | 1 | 1 |
| Y | 1 | 1 | 1 | 1 | 1 | 1 |

Explanatory Notes

Note 1—Silver added to copper in the minimum amount of 25 troy oz./short ton substantially increases its resistance to softening (partial annealing) at elevated temperatures. For copper trolley wire, this means that it can be operated at a higher temperature for longer periods of time without losing its initial tensile strength. For specific conditions of current carrying capacity and corresponding expected temperature rise, refer to the manufacturer for engineering data.

Note 2—It is known that the rapidity with which load is applied to a sample during tension testing affects the performance of the sample to a greater or lesser extent, depending upon many factors. In general, tested values of tensile strength are increased and elongation values are reduced with increase of speed of the moving head of the testing machine. However, there are speeds below which no practical change is observable. It is suggested that tests be made at speeds of moving head which, under no-load conditions, are not greater than 3 in./min, (76 mm/min) but in no case at a speed greater than that at which correct readings can be made. No minimum restriction on speed of testing seems necessary.

Note 3—It is not the intention of this specification to imply that silver bearing copper has greater mechanical properties than non silver bearing. In fact, the addition of silver has no significant effect on the tensile strength of the alloy. The capability to achieve the higher tensile properties required for silver bearing copper is strictly a function of the manufacturer's process.

Note 4—"Resistivity" is used in place of "percentage conductivity." The value of 0.15328 $\Omega \cdot g/m^2$ at 20° C. is the international standard for the resistivity of annealed copper equal to 100% conductivity. This term means that a wire 1 m in length and weighing 1 g would have a resistance of 0.15328Ω. This is equivalent to a resistivity value of 875.20 $\Omega \cdot lb/mile^2$ which signifies the resistance of a wire 1 mile in length weighing 1 lb. It is also equivalent, for example, to 1.7241 $\mu\Omega$/cm of length of a bar 1 $cm^2$ in cross section. A complete discussion of this subject is contained in "NBS Handbook 100" of the National Bureau of Standards. "NBS Handbook 100" available from the National Technical Information Service, 5285 Port Royal Road, Springfield, Va. 22161. Relationships which may be useful in connection with the values of resistivity prescribed in this specification are as follows, each column containing equivalent expressions, at 20° C.

| Conductivity at 20° C., % | 100.00 | 97.16 |
|---|---|---|
| $\Omega \cdot g/m^2$ | 875.20 | 900.77 |
| $\Omega \cdot lb/mile^2$ | 0.15328 | 0.15775 |
| $\Omega \cdot cmil/ft$ | 10.371 | 10.674 |
| $\Omega \cdot mm^2/m$ | 0.017241 | 0.017745 |
| $\Omega \cdot in$ | 0.67879 | 0.69863 |
| $\Omega \cdot cm$ | 1.7241 | 1.17745 |

Note 5—The value of the density of copper is in accordance with the International Annealed Copper Standard. The corresponding value at 0° C. is 8.90 $g/cm^3$ (0.32150 $lb/in.^3$). As pointed out in the discussion of this subject in "NBS Handbook 100"there is no appreciable difference in values of density of hard-drawn and annealed copper wire.

Note 6—The values for area in square inches and circular mils as well as the weight in pounds per mile are calculated from the dimensions given in FIG. 5.

The invention claimed is:

1. A method for making copper trolley wire comprising:

a) casting a copper rod consisting essentially of at least 99.90% by weight copper and at most 0.10% by weight of a metal selected from the group consisting of silver, cadmium, tellurium, titanium, magnesium, manganese, chromium, zirconium, tin and combinations thereof;

b) conforming the copper rod; and c) cold working the copper rod into a coil of wire, said wire having a tensile strength of at least 10% greater than that required for silver bearing copper trolley wire by Tables 1 and 2 and an electrical conductivity at least as great as 97.16% IACS.

2. The method of claim 1 of making copper trolley wire, wherein the casting of the copper rod comprises casting copper rod consisting essentially of at least 99.90% by weight copper and at most 0.10% by weight silver.

3. The method of claim 1 of making copper trolley wire, wherein the cold working reduces the cross sectional area of the copper rod by about 65%.

4. The method of claim 3 of making copper trolley wire, wherein:

the cold working includes drawing the copper rod through more than one die; and the area of the rod is reduced by about 15% through each die.

5. A method for making copper trolley wire, comprising:

a) casting a copper alloy into a wire form consisting essentially of at least 99.90% by weight copper and at most 0.10% by weight silver;

b) conforming the copper alloy cast wire to obtain a grain size not exceeding an average diameter of about 0.035 mm; and c) cold working the wire to a desired final dimension, said wire having a tensile strength of at least 10% greater than that required for silver bearing copper trolley wire by Tables 1 and 2 and an electrical conductivity at least as great as 97.16% IACS.

6. The method of claim 5 of making copper trolley wire, wherein the cold working reduces the cross sectional area of the copper rod by about 65%.

7. The method of claim 5 of making copper trolley wire, wherein:

the cold working includes drawing the copper rod through more than one die; and the area of the rod is reduced by about 15% through each die.

* * * * *